United States Patent
Nolte

[11] Patent Number: 6,024,209
[45] Date of Patent: Feb. 15, 2000

[54] TWO-PART CLEATS

[75] Inventor: Günter Nolte, Moers, Germany

[73] Assignee: SVEDALA Industri (Deutschland) GmbH, Hamburg, Germany

[21] Appl. No.: 09/000,392
[22] PCT Filed: Jul. 10, 1996
[86] PCT No.: PCT/EP96/03019
 § 371 Date: May 13, 1998
 § 102(e) Date: May 13, 1998
[87] PCT Pub. No.: WO97/05046
 PCT Pub. Date: Feb. 13, 1997

[30] Foreign Application Priority Data

Aug. 1, 1995 [DE] Germany .......................... 195 28 205

[51] Int. Cl.$^7$ .............................. B65G 17/36; B65G 17/44
[52] U.S. Cl. ............................................ 198/711; 198/713
[58] Field of Search ..................................... 198/711, 713

[56] References Cited

U.S. PATENT DOCUMENTS

| | | | |
|---|---|---|---|
| 1,432,002 | 10/1922 | Wentz . | |
| 2,875,887 | 3/1959 | Hinchcliffe | 198/199 |
| 3,537,571 | 11/1970 | Weise | 198/193 |
| 4,248,340 | 2/1981 | Hild | 198/711 |
| 5,660,266 | 1/1995 | Nolte | 198/711 |

FOREIGN PATENT DOCUMENTS

| | | |
|---|---|---|
| 971983 | 5/1959 | Germany . |
| 4223634 | 1/1994 | Germany . |
| 4240201 | 6/1994 | Germany . |
| 94/02391 | 2/1994 | WIPO ................................... 198/711 |

*Primary Examiner*—William E. Terrell
*Assistant Examiner*—Mark Deuble
*Attorney, Agent, or Firm*—David Newman Chartered

[57] ABSTRACT

A cleat for a conveyor belt, particularly for a vertical conveyor, with a cleat foot 2 attachable to the support side of the conveyor belt, and in which at least one anchoring member 5 is incorporated, and with a cleat section 1 forming a transverse wall of the conveyor belt, which is releasably attachable to the cleat foot 2 with the aid of the anchoring member 5. With the object of enabling a simpler attachment of the cleat section to the cleat foot, the anchoring member 5 is a rod, which extends transversely to the direction of travel 6 of the conveyor belt in the cleat foot 2. The rod may have threaded holes 12, which match holes 13 in the cleat foot 2 and holes 3 in the cleat section 1, through which screws 4 can be thrust in order to attach the cleat section 1. Alternatively, the rod may have bolts projecting radially therefrom, the bolts for extending through respective holes in the cleat section for securing the cleat section to the cleat foot with nuts.

13 Claims, 3 Drawing Sheets

TWO-PART CLEATS

BACKGROUND OF THE INVENTION

This invention relates to a cleat for a conveyor belt of elastomeric material, particularly for a vertical conveyor, with a cleat foot attachable to the support side of the conveyor belt.

DESCRIPTION OF THE RELEVANT ART

Conveyor belts are known in mining. They are used at an inclination of about 70° as inclined conveyors, or as vertical conveyors, with an even higher inclination. The cleat sections of such a conveyor belt, which form the transverse walls of the buckets for receiving the bulk material, generally firstly extend over two-thirds of their height at right angles to the belt surface and thereafter turn over at an angle of about 45°. However, the straight section of the cleat does not permit any ejection of material directly from the upper turning drum of the conveyor belt, as at the discharge over-run of the upper turning roller, bulk material remains on the straight section of the preceding cleat and is thus taken back down again. This problem is generally counteracted in that the conveyor belt is deflected beneath the turning drum (head station) by means of a deflecting drum, so that bulk material can be totally emptied.

However, the demands made on conveyor belts in mining are always increasing, as conveyance must be made from ever-increasing depths. This requires greater lengths of the conveyor belt, so that the intrinsic weight of the conveyor belt, which is decisive in comparison to the bulk material alone, is increased. By means of deflection of the conveyor belt, the belt's free lateral zones are loaded with the entire weight of the suspended back length of the conveyor belt, so that extremely high specific belt strengths become necessary which, in turn, due to the intrinsic weight of the conveyor belt, restrict the height to which conveying may be carried out.

In order to address this overall problem, attempts have been made in the prior art to use so-called "oblique cleats", which are inclined at a constant angle of about 45° to the belt surface. With such oblique cleats, ejection of the bulk material begins immediately after leaving the upper dead center point and is effected substantially freely without contact with the preceding cleat. However, the problem in such an oblique cleat resides in attaching the cleat with a secure hold on the surface of the belt.

A two-part cleat for a vertical conveyor is known from the publication DE 971 983, which has a cleat foot integrally formed with the conveyor belt, and a cleat section made of sheet metal that forms the transverse wall of the conveyor belt. The cleat section is secured by means of a counterplate and a screw connection to the cleat foot.

U.S. Pat. No. 3,537,571 discloses a chain conveyor of the toothed belt type, with carrier rods which extend transversely to the direction of travel of the conveyor belt in the tooth blocks of the conveyor belt and which project laterally beyond the conveyor belt, where they are connected together by spoke-like lateral members. The spoke-like lateral members are extended beyond the support side of the conveyor belt and include a further carrier rod between the two extended ends of the spoke-like lateral members, upon which a bucket or tub-like conveyor member can be attached by means of a hook. FIG. 3 of U.S. Pat. No. 3,537,571 further discloses the use of two carrier rods having threaded holes into which bolts are screwed, upon whose upper ends a conveyor member is to be attached.

However, U.S. Pat. No. 3,537,571 does not really relate to a conveyor belt, but to a chain conveyor, as described for example in U.S. Pat. No. 4,177,891. The buckets or tubs shown in U.S. Pat. No. 4,177,891 are of such a type as are to be attached to the hook of the chain conveyor of U.S. Pat. No. 3,537,571.

Two-part cleats for conveyor belts of the type already mentioned are known from the publications DE 91 05 048 U, DE 38 35 619 C2 and DE 42 40 201 C1. The cleat feet of these known cleats have a groove, rectangular in cross-section, into which a cleat section forming a transverse wall of the conveyor belt is inserted. The cleat section, which has a contact flange, is attached at or on the cleat foot via U-shaped anchoring members having threaded ends, which are let into the cleat foot. Upon inserting the cleat section into the cleat foot, the ends of the U-shaped anchoring members are passed through matching holes in the contact flange of the cleat section. Nuts are then screwed on to the threaded ends, so that the cleat section receives a secure seat on the cleat foot. The cleat foot is in turn vulcanized on to the belt surface.

SUMMARY OF THE INVENTION

A general object of the present invention is to enable a simpler type of attachment of the cleat section to the cleat foot which reduces manufacturing costs and time for replacement.

Another object of the invention is a two-part cleat having a secure hold on the surface of a conveyor belt.

An additional object of the invention is the use of cleat sections that may be quickly and easily assembled on the cleat feet, enabling the conveyor belt and the cleat feet to be transported by the manufacturer to the point of use separately from the cleat sections.

A further object of the invention is a simple system for mounting cleat sections on the cleat feet, enabling rapid changeover of damaged cleat sections for minimal down-time of the conveyor belt.

According to the present invention, as embodied and broadly described herein, a cleat for a conveyor belt of elastomeric material, particularly for a vertical conveyor, is provided. The cleat has a cleat foot, attachable to the support side of the conveyor belt, in which there is disposed an anchoring member or rod. The cleat further has a cleat section forming a transverse wall of the conveyor belt. The cleat section is attached in a releasable manner to the cleat foot with the aid of the anchoring rod.

The anchoring rod is painted with adhesive during manufacture of the cleat foot, fitted with screws for attaching the cleat section, and is then integrally vulcanized into the cleat foot. After preparation of the cleat foot, the screws can be removed; the position of the anchoring rod in the cleat foot is then fixed. Alternatively, the anchoring rod may be provided at intervals equal to those at which the threaded holes are provided in the rod, with radially projecting bolts, upon which the cleat section can then be thrust and screwed.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
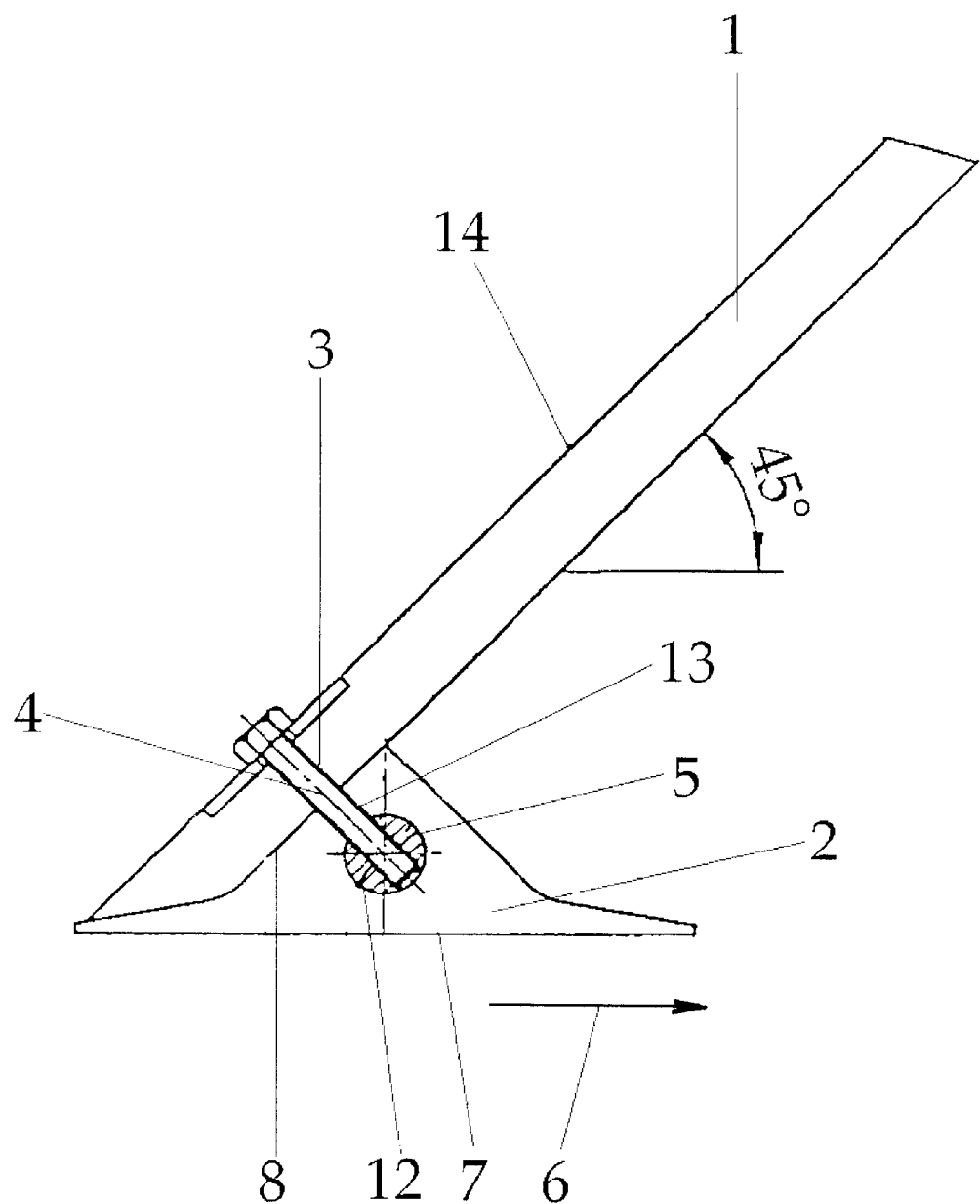
FIG. 1 is a schematic lateral sectional view of a first embodiment of a two-part cleat according to the present invention.

The present invention comprises a cleat for a conveyor belt of elastomeric material, particularly for a vertical conveyor. The cleat has a cleat foot, attachable to the support side of the conveyor belt, in which there is disposed an anchoring member or rod. The cleat further has a cleat section forming a transverse wall of the conveyor belt. The cleat section is attached in a releasable manner to the cleat foot with the aid of the anchoring rod.

The cleat section abuts in a flat manner with only one arm of the cleat foot. A screw or bolt connection penetrates in cross section through the cleat section to secure the cleat section to the cleat foot.

The two-part cleat according to the invention has a series of considerable advantages. On the one hand the cleat sections, which form the transverse walls of the conveyor belt, may be assembled rapidly and easily on the cleat feet, so that the conveyor belt with the cleat feet vulcanized thereon can be transported by the manufacturer to the point of use separately from the cleat sections, which represent the actual cleats. Thus a relatively close interlacing of the conveyor belt is possible during transport, so that conveyor belts with a length of 500 to 600 meters can be transported as one piece. In addition, the simplicity of mounting the cleat sections on the cleat feet enables rapid changeover of a damaged cleat section, which is particularly advantageous as down-times of the conveyor belt are undesirable. Finally, the cleat section itself is simple to produce due to the simplicity of its attachment to the cleat foot, which reduces manufacturing costs.

The cleat foot preferably has an arm, upon which the lower region of the cleat section abuts in a positive-locking manner for attachment to the cleat foot. The advantage of this further development likewise consists in the simplicity of mounting the cleat section on the cleat foot and in the fact that no substantial corners and niches are formed on the back of the cleat section, in which conveyed material can accumulate.

The shape of the cleat foot represents a substantial property of the cleat according to the invention, with such shape preferably having a substantially triangular cross-section. This cleat foot, triangular in cross-section, is vulcanized with the longest side of the triangle to the belt surface, thus providing outstanding transverse stability for the conveyor belt. In addition, the cleat foot itself thus has a very stable form, which is easy to manufacture and is resistant to damage.

Reference now is made in detail to the present preferred embodiments of the invention, examples of which are illustrated in the accompanying drawings, wherein like reference numerals indicate like elements throughout the several views. Two preferred embodiments of the invention, given by way of example, will be described in more detail in the following paragraphs with reference to the drawings.

The exemplary arrangement of FIG. 1 shows a two-part cleat for a conveyor belt, particularly for a vertical conveyor. The two-part cleat comprises a cleat foot 2, having a substantially triangular cross section, and a cleat section 1. A lower portion of the cleat section 1 abuts an arm 8 of the cleat foot and is attached to the cleat foot 2 by an anchoring member or rod 5 having a threaded end. The anchoring rod 5 is also totally surrounded at the end faces by the material of the cleat foot 2, and has threaded holes 12 at freely selectable intervals, which register with corresponding holes 13 in the cleat foot 2.

The cleat section 1 abuts the arm 8 of the cleat foot 2 in such a way that corresponding holes 3 in the cleat section 1 register with holes 13 in the cleat foot 2 and the threaded holes 12 in the anchoring rod 5, so that, in order to secure the cleat section 1 to the cleat foot 2, a respective screw 4 is thrust into the holes 3, 13, and screwed tight in a threaded hole 12. In the assembled condition the lower region of the cleat section 1 conforms closely to the arm 8 of the cleat foot 2 in a positively-engaging manner, so that no niches or edges are formed which could retain bulk material during discharge. In this construction great importance is ascribed to a straight sliding surface on the back 14 of the cleat which is as far as possible unimpaired.

Figure 2:
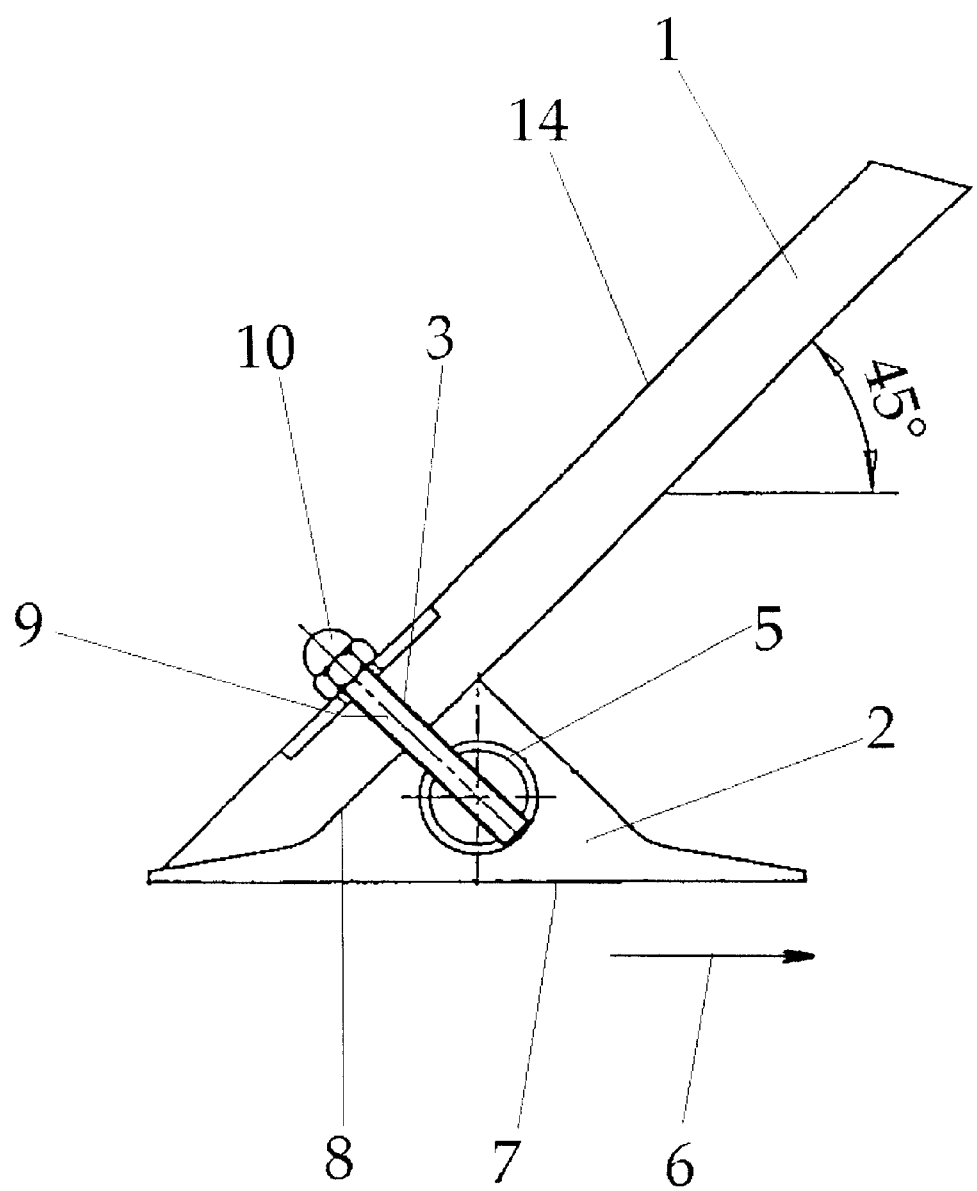
FIG. 2 is a schematic lateral sectional view of a second embodiment of a two-part cleat.

FIG. 2 shows another embodiment of a two-part cleat. In this embodiment, the anchoring member or rod 5 has, instead of the threaded holes 12, bolts 9 projecting radially from the anchoring rod 5 and running vertically to the arm 8 out of the cleat foot 2. During mounting assembly of the cleat section 1 to the cleat foot 2, these bolts 9 are passed through the holes 3 in the cleat section 1 and then secured with nuts 10.

Figure 3:
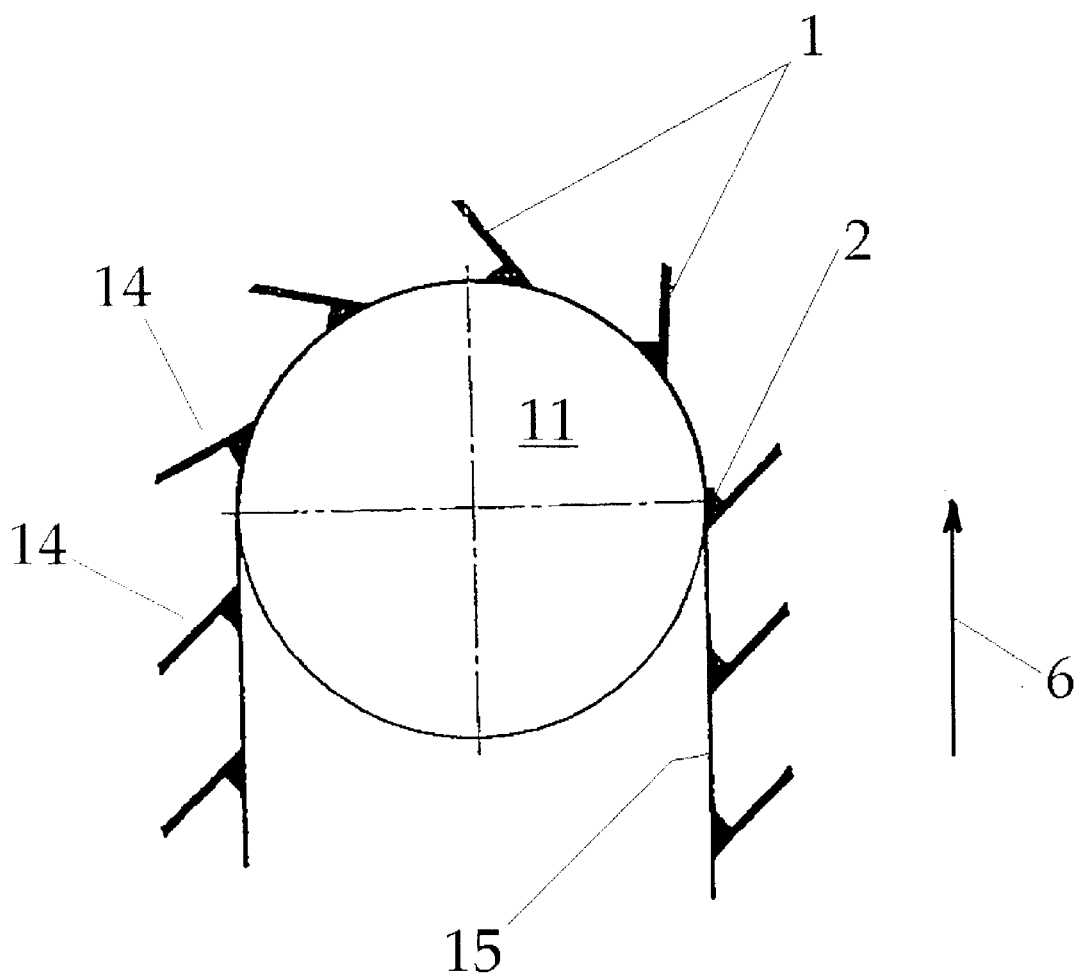
FIG. 3 is a schematic side view of the upper head station of the conveyor belt.

FIG. 3 shows a schematic view of the head station of the conveyor belt 15. In this head station, the conveyor belt 15 runs in the direction of travel 6 about the upper turning drum 11 and thus discharges the bulk material out of the containers formed between the cleat sections 1. When the speed is coordinated precisely with the diameter of the upper turning drum 11, discharge of the bulk material begins directly after leaving the upper dead center point and is substantially free, without contacting the preceding cleat section 1. If, however, bulk material should drop on to the backs 14 of the preceding cleats, the continuous straight inclination of the cleats ensures that the bulk material slips off into the collecting container.

It will be apparent to those skilled in the art that various modifications can be made to the two-part cleat of the instant invention without departing from the scope or spirit of the invention, and it is intended that the present invention cover modifications and variations of the two-part cleat provided they come within the scope of the appended claims and their equivalents.

I claim:

1. A cleat for a conveyor belt of elastomeric material, particularly for a vertical conveyor, comprising:

a cleat foot (2), attachable to a support side of the conveyor belt, having an anchoring member (5) and an arm (8);

a cleat section (1) forming a transverse wall of the conveyor belt, said cleat section having a broad side surface and a lower end surface forming an angle therebetween, said broad side surface and said lower end surface of the cleat section abutting the arm of the cleat foot so as to be flush with the cleat foot, the cleat section releasably attached with aid of the anchoring member (5) to the cleat foot (2); wherein a. said anchoring member (5) includes a rod, extending in the cleat foot (2) transversely to a direction of travel (6) and, c. a screw element (4, 9) of a screw connection (9, 10; 4, 12) extending through a cross section off said cleat section (1).

2. The cleat as set forth in claim 1, wherein the arm of the cleat foot abuts a lower area of the cleat section in a flat manner so that no niches are formed which could retain bulk material during discharge.

3. The cleat as set forth in claim 1 wherein the cleat foot (2) has a triangular cross-sectional shape.

4. The cleat as set forth in claim 1, with said connecting member including a bolt.

5. The cleat as set forth in claim 1, with said connecting member including a screw.

6. A conveyor belt of elastomeric material, particularly a vertical conveyor belt, having a plurality of cleats, each of said plurality of cleats comprising:

a cleat foot, attached to a support side of the conveyor belt, having an arm;

a cleat section forming a transverse wall of the conveyor belt, said cleat section having a broad side surface and a lower end surface forming an angle therebetween, said broad side surface and said lower end surface of said cleat section abutting the arm of the cleat foot so as to be flush with the cleat foot and removably attached to the cleat foot; and an anchoring member, located in the cleat foot, for securing the cleat section to the cleat foot.

7. The conveyor belt as set forth in claim 6, the anchoring member in each of said plurality of cleats including a rod extending transversely to a direction of travel of the conveyor belt, said rod having a threaded hole which aligns with a hole in the cleat foot and a hole in the cleat section, said threaded hole for receiving a screw to secure the cleat section to the cleat foot.

8. The conveyor belt as set forth in claim 6, the anchoring member in each of said plurality of cleats including a rod extending transversely to a direction of travel of the conveyor belt, said rod having a bolt projecting therefrom which aligns with a hole in the cleat section, said bolt for extending through the hole in the cleat section and for securing the cleat section to the cleat foot with a nut.

9. A two-part cleat for a conveyor belt comprising:

a cleat foot, attached to a support side of the conveyor belt, having an arm;

a cleat section having a lower section for abutting the arm, said lower section having a broad side surface and a lower end surface forming an angle therebetween, said broad side surface and said lower end surface of said cleat section abutting the arm of the cleat foot so as to be flush with the cleat foot, said cleat section forming a transverse wall of the conveyor belt and removably attached to the cleat foot; and an anchoring member, integrally vulcanized into the cleat foot, for securing the cleat section to the cleat foot.

10. The conveyor belt as set forth in claim 9, the anchoring member including a rod extending transversely to a direction of travel of the conveyor belt, said rod having a threaded hole which aligns with a hole in the cleat foot and a hole in the cleat section, said threaded hole for receiving a screw to secure the cleat section to the cleat foot.

11. The conveyor belt as set forth in claim 9, the anchoring member including a rod extending transversely to a direction of travel of the conveyor belt, said rod having a bolt projecting therefrom which aligns with a hole in the cleat section, said bolt for extending through the hole in the cleat section and for securing the cleat section to the cleat foot with a nut.

12. The conveyor belt as set forth in claim 9, the anchoring member including a rod extending transversely to a direction of travel of the conveyor belt, said rod having a plurality of threaded holes, each of said plurality of threaded holes for aligning with a respective hole in the cleat foot and a respective hole in the cleat section, said plurality of threaded holes for receiving a plurality of screws, respectively, to secure the cleat section to the cleat foot.

13. The conveyor belt as set forth in claim 9, the anchoring member including a rod extending transversely to a direction of travel of the conveyor belt, said rod having a plurality of bolts projecting radially therefrom, said plurality of bolts for aligning with a plurality of holes in the cleat section, respectively, said plurality of bolts for extending through said plurality of holes in the cleat section, respectively, for securing the cleat section to the cleat foot with a respective plurality of nuts.

* * * * *